US006704396B2

(12) United States Patent
Parolkar et al.

(10) Patent No.: US 6,704,396 B2
(45) Date of Patent: Mar. 9, 2004

(54) MULTI-MODAL COMMUNICATIONS METHOD

(75) Inventors: Satish Parolkar, Austin, TX (US); Vikram Bhavsar, Austin, TX (US)

(73) Assignee: SBC Technology Resources, Inc., Austin, TX (US)

( * ) Notice: Subject to any disclaimer, the term of this patent is extended or adjusted under 35 U.S.C. 154(b) by 0 days.

(21) Appl. No.: 10/083,472

(22) Filed: Feb. 27, 2002

(65) Prior Publication Data

US 2003/0161448 A1 Aug. 28, 2003

(51) Int. Cl.[7] .......................... H04M 1/64; H04M 3/00
(52) U.S. Cl. ......................... 379/88.17; 379/88.13; 379/88.18; 379/265.01; 379/265.02; 379/265.09
(58) Field of Search .................... 379/67.1, 88.13, 379/88.17, 88.18, 265.01, 265.02, 265.09, 900, 908; 370/312, 352, 353, 354; 709/200, 218, 227

(56) References Cited

U.S. PATENT DOCUMENTS

| | | | |
|---|---|---|---|
| 5,946,684 A | 8/1999 | Lund | 707/10 |
| 5,978,806 A | 11/1999 | Lund | 707/10 |
| 5,999,965 A * | 12/1999 | Kelly | 709/202 |
| 6,046,762 A | 4/2000 | Sonesh et al. | 348/16 |
| 6,067,546 A | 5/2000 | Lund | 707/10 |
| 6,070,149 A | 5/2000 | Tavor et al. | 705/26 |
| 6,145,096 A | 11/2000 | Bereiter et al. | 714/25 |
| 6,154,528 A | 11/2000 | Bennett, III et al. | 379/93.25 |
| 6,324,276 B1 | 11/2001 | Uppaluru et al. | 379/220.01 |
| 6,385,309 B1 | 5/2002 | Bennett, III et al. | 379/93.25 |
| 6,445,695 B1 * | 9/2002 | Christie, IV | 370/352 |
| 6,446,127 B1 * | 9/2002 | Schuster et al. | 709/227 |
| 6,477,150 B1 * | 11/2002 | Maggenti et al. | 370/312 |
| 2001/0005372 A1 | 6/2001 | Cave et al. | 370/401 |
| 2001/0047292 A1 | 11/2001 | Montoya | 705/10 |
| 2001/0047294 A1 | 11/2001 | Rothschild | 705/14 |
| 2001/0049603 A1 | 12/2001 | Sravanapudi et al. | 704/270.01 |

FOREIGN PATENT DOCUMENTS

| | | | |
|---|---|---|---|
| EP | 1143679 | 10/2001 | |
| WO | 0021075 | 4/2000 | |
| WO | 01/24447 | 4/2001 | |
| WO | WO 01/24447 | * 4/2001 | H04L/12/00 |

OTHER PUBLICATIONS

"A SIP Perspective on the New Converged World", by Sinnreich, Dec. 19, 2001, http://www.sipforum.com.
"Internet Communications Enabled by SIP", by Sinnreich, Dec. 19, 2001, http://www.sipforum.org/whitepapers/sinnreich.htm.
"Speech Interface Implementation for XML Browser", by Teppo et al., Dec. 19, 2001, http:www.tml.hut.fi/~0=pv/.
"The Interface between Next-Generation Application Servers and Medial Servers: SIP and VoiceXML", by Burger, Dec. 19, 2001, http:www.voicexmlreview.org/Oct2001/features/nextgen.html.

* cited by examiner

*Primary Examiner*—Allan Hoosain
(74) *Attorney, Agent, or Firm*—Greenblum & Bernstein, P.L.C.

(57) ABSTRACT

Communications between an agent and a party using a communications device involve sending an interactive script using session initiation protocol (SIP) to the communications device. The interactive script gathers information from the communications device or a user of the communications device and the requested information is then forwarded to an agent terminal using SIP. The interactive script is written in a high-level language and securely stored, such that an authorized party can easily access and alter the script to suit a need for particular information.

24 Claims, 4 Drawing Sheets

MULTI-MODAL COMMUNICATIONS METHOD

BACKGROUND OF THE INVENTION

1. Field of the Invention

The present invention relates to data collection. More particularly, the present invention relates to collecting information from a smart device or a user of a smart device by sending a message with an interactive script in a generic format to the smart device for processing.

2. Background Information

In a conventional call center environment, an interactive voice response unit (IVR) may be used to collect information. Collected information may be used, for example, to determine the purpose of the call so that the call may be efficiently routed to an appropriate agent. As an alternative, a human screener may be used to collect information from the caller and transfer the call to an appropriate agent for handling.

An IVR may operate by sending voice instructions to the caller and receiving digital input signals in response from the caller. An IVR may also be provided with speech recognition software to recognize verbal responses from the caller.

In the internet age, an internet user may attempt to contact a human or programmed automated customer service agent operating through a web-site. The web-site may present the user with a form in order for the user to input information manually. In addition, a conventional web-site may be programmed to transmit a so-called "cookie", or applet, to a user's browser in order to facilitate future communications between the user and the web-site by collecting and storing information about the user.

In order to improve efficiencies in the communications system, a next generation communications device has been developed that is programmable, i.e. "smart". A smart device enables a user to communicate via voice and/or text modes. A smart device is any device that contains a micro-processor to process instructions of a software program. Such smart devices contain internet browsing capability in addition to conventional transmission and reception of voice and data capabilities, order to navigate the internet either via wireline or wireless networks.

Currently, an interactive voice dialog may be established through the internet via a click-to-chat, click-to-talk mechanism, over conventional wireline or wireless telephones. As an example, in a contact center environment, a customer connected to the internet may click on a screen icon to reach the call center. When the customer clicks to contact the call center the call is first sent to a call queue where it waits for a call agent to become available. Once an agent is available, the customer call is transferred from the call queue to the call agent.

Calls received via the click-to-talk mode are routed based on the URL at which the click to talk button was pressed or a series of cookies that gathered the user's actions. The caller is not asked for the intent of the call in advance, which can lead to delivering the call to an improper agent, resulting in unnecessary transfer of the caller between agents.

Furthermore, a next generation communications device may be able to communicate using several different modes, either alternatively or simultaneously. For example, on a single internet-enabled device, a caller may use any of the public switched telephone network (PSTN), a wireless network, or a cable to attempt to contact an agent via analog or digital voice, or voice over internet protocol (VOIP). In addition, a caller using the internet may attempt to contact an agent via a text interface using an IP format. A portable communications device may simultaneously support several modes of communication, such as presently available voice and text transmission formats, as well as other transmission formats as they are developed.

A smart device will be able to run a program that collects information so that information may be automatically collected for a requestor. To date, an integrated multi-modal method of collecting information has not been provided in a single system. Moreover, a method is needed to transmit and receive questions and responses over a network in a common format that is independent of a particular communications mode or format. Additionally, a method is needed for automated data-collection such that a questionnaire can be easily modified from any device connected to the network using a compatible modality. Accordingly, a system is needed to automate the collection of information from next generation smart devices and their users.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which.

DETAILED DESCRIPTION OF THE INVENTION

Figure 1:
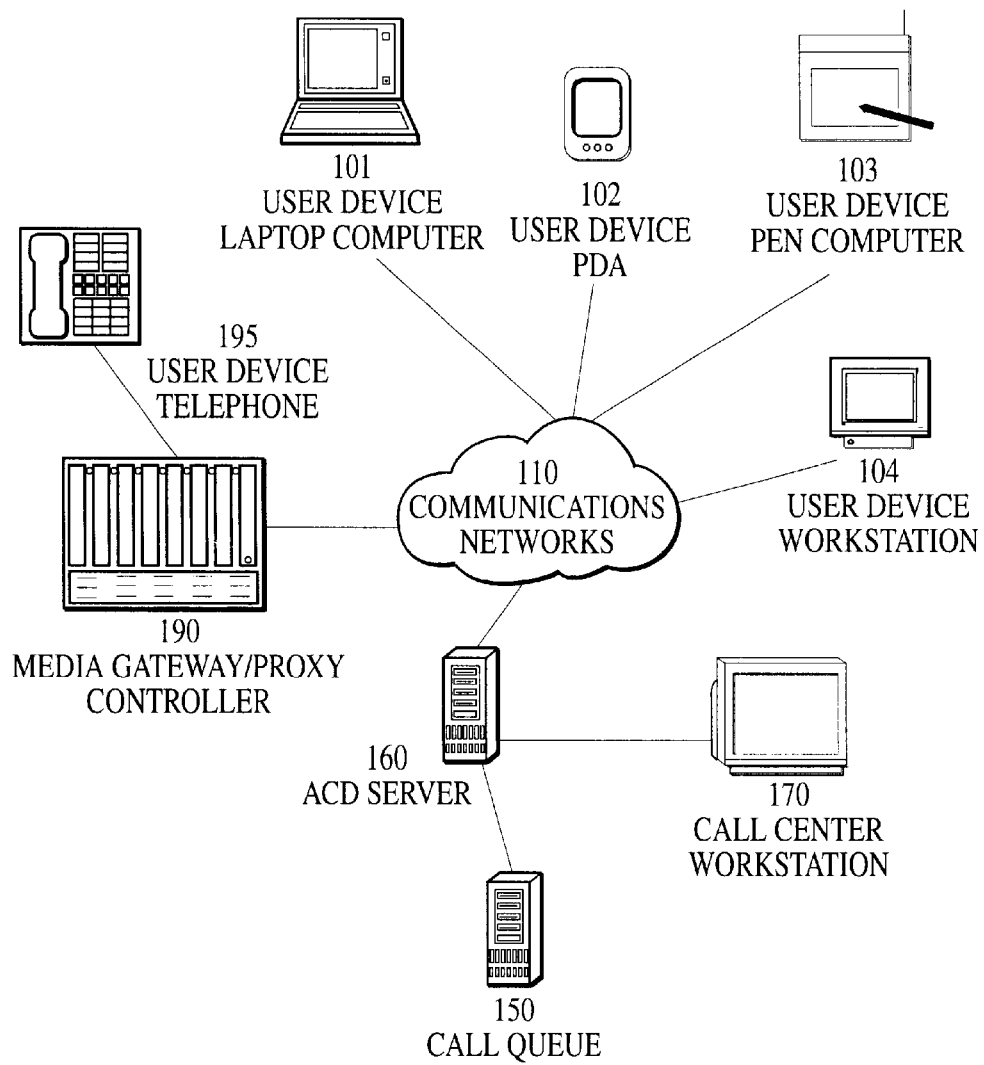
FIG. 1 shows an exemplary communications network architecture for collecting information.

In view of the foregoing, the present invention, through one or more of its various aspects, embodiments and/or specific features or sub-components, is thus intended to bring out one or more of the advantages as specifically noted below.

In one aspect of the present invention, a method of collecting information from a communications device of a user for use by a recipient device is provided. The method includes establishing a communications connection between the communications device and the recipient device. An interactive text markup programming language script is sent to the communications device using a session initiation protocol (SIP) message. The script includes at least one query. In response to the query, an answer is received from the communications device. The answer is generated by the communications device and/or based upon an input by the user.

In another aspect of the present invention, the method of collecting information includes sending a message to either a proxy server or a redirect server to establish the communications connection between the communications device and the recipient.

In yet another aspect of the present invention, the received answer includes information of a location of the communications device, a type of the communications device, a communications format used by the communications device, a communications mode desired by the user of the communications device, a personal identification of a user of the communications device, an account number of a user of the communications device, a password of a user of the communications device, billing information of a user of the communications device, the intent of the user of the communications device, a preferred language of a user of the communications device, and/or a question from the user of the communications device.

In another aspect of present invention, the received answer is a textual representation of either a DTMF tone, VoiceXML or HTML speech tags. In yet another aspect of the present invention, the method of collecting information includes providing the answer to a user of the recipient device. In still another aspect of the present invention, the interactive script includes a first query and a second query that depends on the answer to the first query. In another aspect of the present invention, the method of collecting information includes translating the answer to the interactive script into text.

According to a further aspect of the present invention, a method of determining a final call destination for a caller using a communications device is provided. The method includes sending an interactive text markup programming language script, including at least one query, from a call queue to the communications device using a session initiation protocol (SIP) message. An attempt is made to receive an answer to each query from the communications device without requiring an action by the user of the communications device. For each query that is not answered by the communications device, the query is presented to the caller via a user interface associated with the communications device. When an answer(s) to the at least one query has been received from the communications device or the caller, the script and the answers to the call queue are returned. The call destination is determined based on the answers to the at least one query.

In another aspect of the present invention, the method of determining the final call destination includes sending a message to either a proxy server or a redirect server.

In still another aspect of the present invention, the received answer includes information of a location of the communications device, a type of the communications device, a communications format used by the communications device, a communications mode desired by the user of the communications device, a personal identification of a user of the communications device, an account number of a user of the communications device, a password of a user of the communications device, billing information of a user of the communications device, the intent of the user of the communications device, a preferred language of a user of the communications device, and/or a question from the user of the communications device.

In another aspect of the present invention, the received answer is a textual representation of one of a DTMF tone, VoiceXML and HTML speech tags. In yet another aspect of the present invention, the answers to the query are provided to an agent at the final call destination. In still another aspect of the present invention, the interactive script includes a first query and a second query that depends on the answer to the first query. In another aspect of the present invention, the method of determining the final call destination includes translating the answers to the interactive script into text.

In another aspect of the present invention, a method of interactively pre-screening caller information of a caller using a communications device is provided. The method includes establishing a communications connection between an information service and the communications device. An interactive text markup programming language script, including at least one query, is sent from the information service to the communications device used by the caller, using a session initiation protocol (SIP) message. At least one answer to the query is integrated into the interactive script, the answer being generated from the communications device and/or generated from input by the caller. The script, including the at least one answer, is received at the information service.

In another aspect of the present invention, the method of interactively pre-screening caller information includes establishing a second connection between the communications device and one of multiple agent devices, using SIP. The particular agent device is determined based on the at least one answer. In yet another aspect of the present invention, the method of interactively pre-screening caller information includes, sending a message to either a proxy server or a redirect server to establish the communications connection.

In yet another aspect of the present invention, the received answer includes information of a location of the communications device, a type of the communications device, a communications format used by the communications device, a communications mode desired by the user of the communications device, a personal identification of a user of the communications device, an account number of a user of the communications device, a password of a user of the communications device, billing information of a user of the communications device, the intent of the user of the communications device, a preferred language of a user of the communications device, and/or a question from the user of the communications device.

In another aspect of the present invention, the received answer is a textual representation of either a DTMF tone, VoiceXML or HTML speech tags. In still another aspect of the present invention, the method of interactively pre-screening caller information includes providing the answer to an agent of the information service at an agent terminal. In yet another aspect of the present invention, the at least one query of the interactive script includes a first query and a second query that is based upon a first answer to the first query. In another aspect of the present invention, the method of interactively pre-screening caller information includes translating the answers to the interactive script into text.

In a further aspect of the present invention, a computer readable medium is provided for storing a computer program that controls collection of information from a communications device of a user for receipt at a recipient device. The computer readable medium includes a session initiation protocol (SIP) segment that creates a session initiation protocol message that is sent to the communications device. The SIP message includes an interactive text markup programming language script with at least one query. The computer readable medium also includes a data processing segment that receives and analyzes an answer from the communications device in response to the at least one query. The answer(s) are generated by the communications device and/or based upon an input by the user.

In a further aspect of the present invention, a data reception system that receives collected data from a communications device of a caller is provided. The data reception system includes an automated call distributor that receives a call from a user device over an IP network. The data reception system also includes a call queue that receives the call from the automated call distributor and sends an interactive text markup programming language script, including at least one query, to the communications device of the caller using a session initiation protocol (SIP) message. A media gateway is provided that translates the script into a format compatible with the communications device of the caller when the communications device of the caller does not support the modality of the script as sent by the call queue. When an answer to the at least one query has been received from the communications device or the caller, the answers are processed at the call queue.

A communications system is provided for facilitating communications between a user (client) of a communications device and a recipient, such as an information service, customer service agent or the like. The communications system and method of the present invention may also be utilized by any party having a use for caller information, such as a small business or even a private citizen in some cases. The communications system supports multiple communications modes, at least including voice and text, so that an agent may communicate with a user using any of the multiple modes. As used herein, the term "agent" should be considered in the context of an end recipient of a call, which may include electronic peripheral devices.

Calls may use any of a multiple formats, including traditional voice calls over the plain old telephone system (POTS) or an advanced intelligent network (AIN), voice calls over a wireless network such as a third generation partnership project (3GPP) network, voice calls using the internet (VOIP), text messaging using any of the formats used for voice calls, or any other type of communications carried out over a network. Therefore, the terms "call" or "caller" should be considered in the context of any type of interactive electronic communications between two parties or electronic devices.

In one embodiment, a call recipient is an agent associated with a call center including a call queue and an automated call distributor (ACD). A call queue is typically a server that tracks and interacts with incoming calls. The automated call distributor receives calls from a customer (user/client) and may connect the call to a call queue, either automatically or after determining that all agents are unavailable.

An exemplary network for user devices to contact an agent is shown in FIG. 1. A user using an IP-compatible laptop computer 101, personal digital assistant (PDA) 102, pen computer 103, or workstation 104 is connected to communications network 110. Communications network 110 is an IP network that can be contacted by a user device by, for example, dial-up. User devices 101, 102, 103 and 104 may also be connected on a permanent or semi-permanent basis to the network 110 by connections such as cable hook-ups or wireless connections, e.g., a wireless network.

In the embodiment of FIG. 1, the communications network 110 is connected to an automated call distributor (ACD) 160. The automated call distributor 160 is connected to a call queue 150, such as a server. As noted herein, a call queue 150 tracks and communicates with calls after they are received at a destination. The call queue 150 may communicate with calls to ensure they are forwarded to agents in a determined order or priority, such as the order in which they are received or a most appropriate agent as determined by an agent or agent/caller scoring system. When an appropriate agent is available, the call queue 150 is notified and initiates a call transfer. The call transfer may include the initiation of another call and the establishment of another connection directly from the customer to the call agent through the ACD 160, in which case the call queue 150 may wait for notification of a successful connection between the customer and the agent before removing the call session from the queue. A connection is established with an agent at, for example, a workstation, such as workstation 170, for processing.

In the case where the communications network 110 is the PSTN, a media gateway/proxy controller 190 may be used as an intermediate proxy for the caller's device. As described herein, the media gateway/proxy controller 190 may serve as a proxy or translator for a user with a conventional communications device 195, such as a conventional telephone. In the case of a user with a conventional telephone, the media gateway/proxy controller 190 can receive an interactive script and translate the script into voice response dialogue to be played to the caller.

Figure 2:
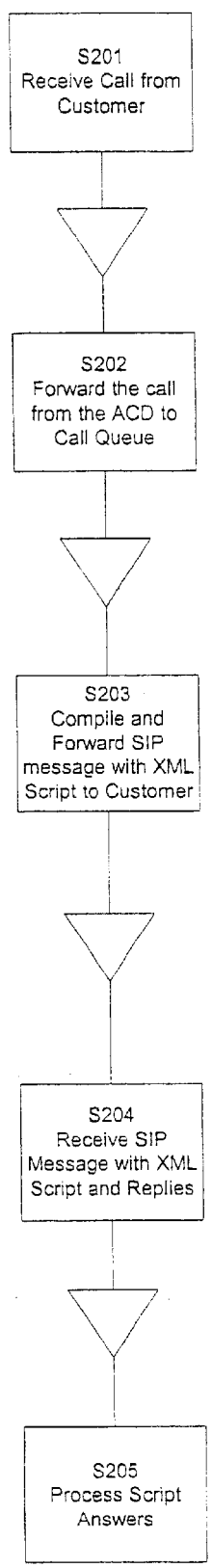
FIG. 2 is an exemplary flow diagram showing a method of collecting information.

The information collection method of the present invention in the call center embodiment is shown in FIG. 2. At step S201, a call is received from a customer at the ACD 160. At step S202, the call is forwarded from the ACD 160 to the call queue 150.

In the call center embodiment, upon receipt of the call at the call queue 150 in step S202, the receiving apparatus, in this case the call queue 150, compiles and forwards back to the user's device a session initiation protocol (SIP) MESSAGE with an interactive script in the message portion at step S203. SIP and SIP MESSAGES are described in detail below. The interactive script may be in a programming format that is recognizable by the user's device, such that the user's device processes the interactive script. As described below, in one embodiment the interactive script is in a text mark-up language, such as extensible markup language (XML). The script that is forwarded to the client device may be utilized by an applet embedded in a browser of the user's device to collect information from the user's device. The information may have been previously partially or fully collected and stored by the browser of the user's device in response to previous queries by either the called party or any other party prompting the user's device to collect information. In the alternative, the browser may collect the information from the client device based only upon the newly received XML script. Additionally, when the media gateway/proxy controller 190 or a similar device is necessary to process a script and translate script queries into voice signals for the caller, the information collected from the caller may not have been previously stored at the user's device, such as when the user's device is a legacy telephone handset.

The interactive script may process information from the user's device or the user in a set order. For example, the interactive script may present individual questions to the user and then wait until a response has been provided by the user before proceeding to the next question. In the alternative, the interactive script may present a first question to a user and then decide a second question to present to the user based upon the user's reply to the first question. For example, if a user is first asked what language they speak, the subsequent questions may be presented in the language selected by the user. In addition, a user may be asked the purpose of their call, in which case the subsequent questions from the interactive script may depend on the answer provided by the user. The script may also seek to obtain information from the user's device automatically by collecting data that has been previously collected and stored at the user's device or a proxy or associated device, such as a database associated with the media gateway/proxy controller 190. The information may have been automatically collected by a script forwarded with an applet or the information may have been collected in previous communications involving a script that was sent to an applet.

Information may also be pre-programmed at the smart device by the user. For instance, a user's device may be pre-programmed to indicate that the user speaks a particular language. Accordingly, when a SIP questionnaire requests information on a language used by the caller, the user's smart device automatically provides the answer without requiring input from the caller, thereby affecting the format of any subsequent queries presented to the user. Additionally, the smart device manufacturer may pre-program information such as a model number, date of purchase, technical specifications including modalities supported by the device, memory size and processing speed. In addition, third party service providers may provide information for automatic collection, such as billing information, credit verification and authorization and security protocols. In an embodiment, the information collected using the SIP questionnaire will be automatically collected at the user's device without requiring responsive input by the caller at the time of the call.

A SIP MESSAGE with a text markup language script and replies is received at the automated call distributor 160, and forwarded to the call queue 150 in the call center embodiment, at step S204. The answers of the script are processed at step S205. The answers may be utilized to determine a proper agent to handle the call, such as in the case where a caller speaks a foreign language. In addition, answers may be presented in text format to the agent that receives the call to expedite processing of the call. Answers may also be stored in a database associated with the call center, in which case the answers may be compiled and statistically analyzed to enhance call center operation.

In the embodiment where the agent is associated with a call center, the automated call distributor 160 will connect the call to a call queue 150 where it waits for the next available agent. Accordingly, the SIP messaging occurs while the call is waiting at the call queue 150. As agents become available they will notify the call queue 150 that they are available to take a new call. If there is a call waiting, then the call queue 150 responds by informing the agent that there is a call in the call queue 150 and then initiating a call transfer from the call queue 150 to the available agent. As a result, a call is established between the customer and an agent. The customer device notifies the call queue 150 that the transfer was successful and the call queue 150 removes the call from the call queue 150.

SIP Messages are used in communications involving an IP-enabled network. The SIP "MESSAGE & NOTIFY" is used to initiate a call to visit an address, such as when a user types in a web-site's URL. The "call" involving SIP is to be distinguished from an initial call in which the user contacts the network, such as a dial-up session. However, it should be noted that SIP is used when a user of a smart device connected to the network wishes to utilize voice communication capabilities to perform a secondary call, such as by clicking on a "Click to Talk" button on a web screen to call another party, using the web-site providing the web screen as an intermediary.

SIP provides necessary protocols for end and intermediate systems to use in providing services. Services can be provided for sessions including, but not limited to, internet conferencing, telephony and instant messaging sessions. SIP can also be used to initiate calls between legacy-type telephone devices, if the necessary switches are suitably equipped. However, it should be noted that a legacy-type telephone device that is not IP-compatible would not necessarily have a particular use for SIP except in cooperation with additional network elements such as the media gateway/proxy controller 190, or a peripheral device performing a similar function. Services that can be provided using SIP protocols include IVR services, call forwarding, number delivery/caller ID, personal mobility, terminal-type negotiation and selection, caller authentication, call transfer and invitations to multicast conferences. In cases such as call forwarding or authenticating caller ID, a proxy server may also negotiate the call using SIP. Furthermore, a proxy server may negotiate the call, regardless of the service provided, in some session types, including click-to-talk. Accordingly, SIP messages may be routed using proxy or redirect servers. In addition, SIP messages may be transmitted over existing IP-enabling networks having conventional or advanced intelligent network elements including service control points (SCPs), service switching points (SSPs) and lookup databases, such as address lookup databases.

In the present invention, a SIP MESSAGE session is utilized by sending an interactive script to the user's device in the message area of a SIP message. The interactive script may be a programming script in an XML format. In any case, proprietary defined SIP message headers are avoided so that a standard SIP message may also be used in a conventional manner without confusion in addition to the interactive script messaging.

The message sent in the SIP MESSAGE session may include a questionnaire for use with an embedded program, such as an applet, in the client device. In the alternative, the message may comprise a complete self-contained program including an applet and questionnaire format.

Figure 3A:
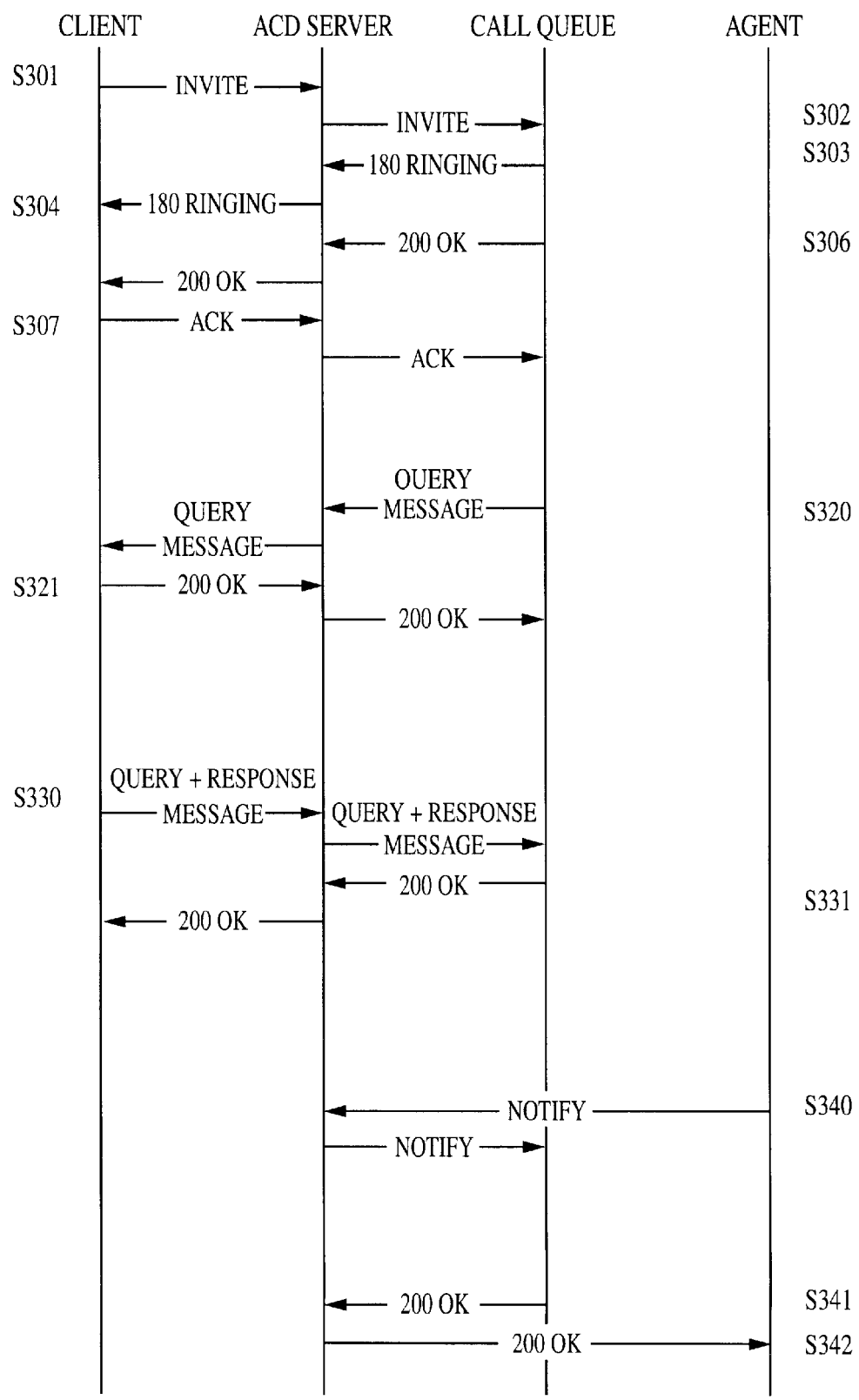
FIGS. 3A and 3B show an exemplary call flow diagram showing the various steps for sending and receiving an interactive script to be executed to a user device.
Figure 3B:
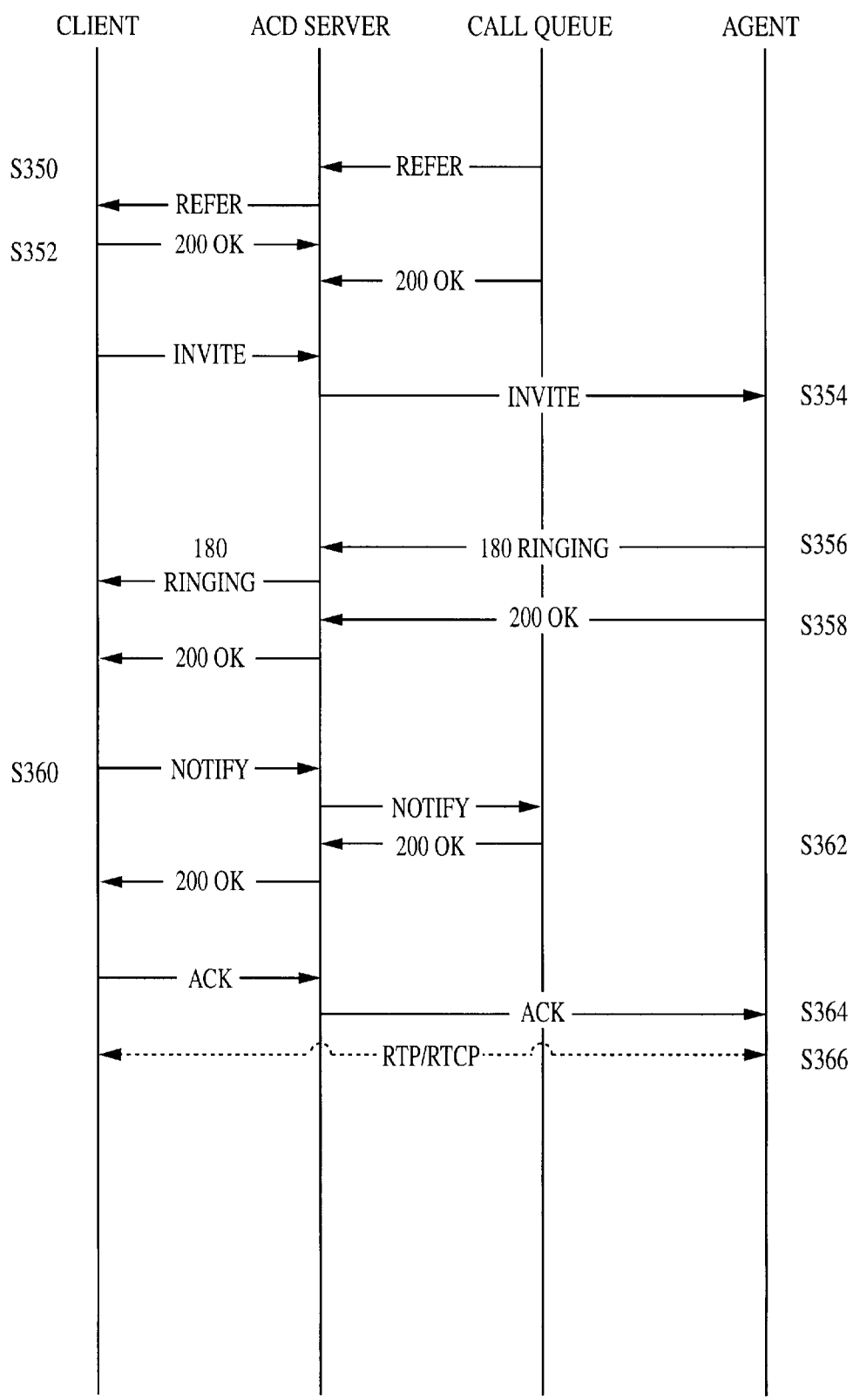

An exemplary call flow using session initiation protocol messages is shown in FIGS. 3A and 3B. FIGS. 3A and 3B show an exemplary call flow diagram that illustrates a sequence of operations between the various components of the system in the call center embodiment of the present invention when a client device attempts to contact an agent. No attempt has been made to show every possible operation in a call flow sequence. Rather, details have been provided to explain the sequence of operations in a call to the exemplary call center that includes sending and receiving a SIP MESSAGE.

A call flow sequence starts when a user has input enough information to a device to initiate a call. At step S301, the user's device sends an INVITE message to the automated call distributor 160 which relays the INVITE message to a call queue 150 at step S302. The INVITE message is an invitation to the call center to engage in a session. At step S303, upon receipt of the INVITE message, the call queue 150 indicates RINGING to the automated call distributor 160 which relays the RINGING indication to the client device at step S304. The RINGING message could result in the caller hearing a ring tone or seeing a text message indicator equivalent to a ring tone, such as "attempting call—no answer yet". The call queue 150 also sends an OK message to the client via the automated call distributor 160 to acknowledge receipt of the INVITE message at step S306. At step S307, the client sends an acknowledge (ACK) message to the ACD server, which relays the acknowledge message to the call queue 150. The acknowledgment message is sent to acknowledge that the call has been answered and a session has been established.

Once the call is in progress with the client and call queue 150, i.e. once the call is answered at the call queue 150, a SIP MESSAGE is sent to the client with a markup language, such as XML, questionnaire to collect information from the customer at step S320. The questionnaire may include a complete data request for use in the case when the user has not previously contacted the call center. In the alternative, in the case that a questionnaire has been previously submitted to the client device, or if the client device has a compatible applet that is embedded with available information already collected, the questionnaire may include an update data request for the applet to use in collecting information from the caller.

The SIP MESSAGE is sent from the call queue 150 to the automated call distributor 160 which relays the SIP MESSAGE to the client. The client sends a new OK message to the call queue 150 via the automated call distributor 160 at step S321.

After the client application gathers the information based on the questionnaire from the customer, the client sends a SIP MESSAGE back to the call queue 150 at step S330 with the questionnaire, and including the customer information. A SIP MESSAGE is sent from the client to the automated call distributor 160 which relays the SIP MESSAGE to the call queue 150. An OK message is sent from the call queue 150 to the client via the automated call distributor 160 at step S331.

The call queue 150 may then process the information received in the SIP MESSAGE from the questionnaire and determine a proper agent to handle the customer's call. At step S340 when an agent is available, the agent sends a SIP NOTIFY to the ACD server 160 which forwards a SIP NOTIFY to the call queue 150.

If the call queue 150 determines that the agent responsible for sending the SIP NOTIFY can handle the call, a SIP 200 OK message is sent to the ACD server at step S341. The SIP 200 OK message is relayed to the agent from the ACD server 160 along with the customer information collected from the customer using the text markup language script at step S342.

To complete the call connection between the client and the agent, the call queue 150 initiates a call transfer from the call queue 150 to the available agent at step S350. The call queue 150 sends a REFER message to the ACD server which relays the REFER message to the client. The client sends an OK message to the ACD server 160 which, in turn, sends an OK message to the call queue 150 at step S352. The client application initiates an invitation to the agent by sending an INVITE message to the agent via the ACD server 160 at step S354. The agent application anticipates the call, having previously sent the NOTIFY message to notify the call queue 150 of the agent's availability at step S340. The agent responds to the INVITE message in step S354 by sending a RINGING message to the client via the ACD server at step S356. The agent also sends an OK message to the client via the ACD server 160 at step S358. At step S360, the client application notifies the call queue 150, via ACD server 160, once the call has successfully been transferred. The call queue 150 sends an OK message back to the client, via the ACD server 160, at step S362. As a result, the call is established between the client and the agent. An acknowledgment (ACK) message is sent from the client to the ACD server 160 which, in turn, sends an acknowledgment message to the agent at step S364. The acknowledgment messages conclude the relevant SIP messaging for establishing the call between the client and the agent. At step S366, the exemplary call is conducted between the client and the agent a using a real-time transport protocol (RTP) and/or real time conferencing protocol (RTCP).

In the call center embodiment, in addition to utilizing the collected information to route the call to a proper agent, an additional benefit is realized when the collected information includes data that can be given to the agent at the onset of the call, thus better equipping the agent to handle the call. For example, using the data collection method disclosed herein, an agent may obtain information regarding the nature of the call (e.g., the call relates to the caller hearing a "buzzing" on the line) at virtually the same time as the caller is connected to the agent. The call center agent is thus better equipped to handle the call with the information presented at the outset of the call. In the embodiment where the data is automatically collected at the client device, information may be available for the agent even when the call is not delayed at the call queue. Additionally, when the call is delayed at the call queue, a caller may be requested to input responses to queries from the script.

The conventional SIP MESSAGE is sent as plain/text data and can be used for instant messaging. However, the method and apparatus of the instant invention use the SIP MESSAGE in a unique manner by sending software instructions, such as XML language instructions to be executed at a user's smart device. The rules of an XML format of the instant invention may follow the exemplary document type definition (DTD) as follows:

```
<!ELEMENT questionnaire (question+)>
<!ELEMENT question (question_text, answer_list*)>
<!ATTLIST question answer_type (text|list|YN)>
<!ATTLIST question question_desc (#PCDATA)>
<!ELEMENT text EMPTY>
<!ELEMENT list EMPTY>
<!ELEMENT YN (Yes|No)>
<!ELEMENT answer_list (#PCDATA)>
<!ATTLIST answer_list ID #REQUIRED>
```

Following is an exemplary questionnaire (script) for a client application to use to collect customer information using an interactive XML script in a SIP MESSAGE:

```
<questionnaire>
    <question answer_type='text' question_desc='City'>
        <question_text>
            What city are you calling from?
        </question_text>
    </question>
    <question answer_type='list' question_desc='Priority'>
        <question_text>
            How urgent is the problem for your call?
        </question_text>
        <answer_list>
            <answer_list_answer id='1'>
                Emergency
            </answer_list_answer>
            <answer_list_answer id='2'>
                Resolve as soon as possible
            </answer_list_answer>
            <answer_list_answer id='3'>
                Not immediate problem
            </answer_list_answer>
            <answer_list_answer id='4'>
                N/A
            </answer_list_answer>
        </answer_list>
    </question>
    <question answer_type='YN' question_desc="Under Warranty'>
        <question_text>
            Is the product you are calling about still under warranty?
        </question_text>
    </question>
</questionnaire>
```

The use of a widely available, high level language, such as XML, allows the system to be dynamic. As a result, the interactive script can be built or revised by an owner, or authorized representative of the owner, at virtually any time from any location provided with access to a communications network supporting one of the modes used by the data collection system. For example, an internet web page may be provided that will allow an authorized user to customize the script as the user desires.

According to the present invention, a script manager may use a manager device, such as laptop, scanner or desktop to access the stored script in order to modify the interactive script. Accordingly, a manager may modify the script from virtually anywhere in the world at any time if the manager can access an IP compatible communications network, including wireless and the PSTN. Instructions for modifications can be translated into text by any known translation method that translates, for example, voice instructions or handwriting into a text format for entry at the script storage. In an embodiment, the script manager will be versed in XML and will provide the instructions directly to the script storage, after satisfying any necessary security procedures to access the storage.

As shown in FIGS. 3A and 3B and discussed above, in a call center embodiment, the script is forwarded when a call is established at the call queue 150. The script is sent as part of an SIP MESSAGE to the client. The client responds with a SIP OK message indicating that it received the message from the call queue 150. The client application then processes the script. The smart device may be provided with voice capability, including voice recognition, so that a caller may be prompted vocally to provide information responsive to the script when the text markup language script is translated into voice signals. The smart device may be provided with text capability, including character or handwriting recognition, so that a caller may be visually prompted with a text message to provide information responsive to the script. The caller may be prompted to speak, type or write a response if the information cannot be automatically collected at the applet. Moreover, similar to the conventional applet that is provided for internet use, the smart device may be provided with the capability to automatically provide information responsive to the script.

The smart device may further support translation of speech or audio tones into text. Accordingly, a user may provide voice or digital input responsive to queries generated using the script. For example, the smart device may translate a DTMF signal, such as a digitally input DTMF signal from a keypad, into a textual representation of the keypad or keyboard character that was pressed by the user. Additionally, the smart device may support VoiceXML and HTML speech tags that represent textual translation of a user's voice input responsive to a script query. The textual representation of the DTMF, VoiceXML, HTML or other audio-to-textual format, may be forwarded with the script for use of the party that sent the script to the user.

The script is updated with the answers to the script queries. When the script queries are exhausted, the client application sends a SIP MESSAGE to the call queue 150 with the questionnaire and the responsive information. The call queue 150 may use the received answers, e.g., to determine the call agent best capable of handling the call. Furthermore, the call queue 150 may store the data in, for example, a database, so that the information can be transferred to an agent when an appropriate agent is available.

An exemplary script question is presented below:

```
MESSAGE sip:customer@client.com SIP/2.0
Via: SIP/2.0/UDP ACDServer.com
Via: SIP/2.0/UDP CallQueue.com
From: sip:SBC@CallQueue.com
To: sip:customer@client.com
Call-ID: SBCtoCustomerCall_12345
Cseq: 1 MESSAGE
Content-Type: text/xml
Content-Length: 187
<questionnaire>
    <question answer_type='text' question_desc='City'>
        <question_text>
            What city are you calling form?
        </question_text>
    </question>
</questionnaire>
```

An exemplary message, responsive to the above-described question, appears below:

```
MESSAGE sip:SBC@CallQueue.com SIP/2.0
Via: SIP/2.0/UDP ACDServer.com
Via: SIP/2.0/UDP Client.com
From: sip:customer@Client.com
To: sip:SBC@CallQueue.com
Call-ID: SBCtoCutomerCall_12345
Cseq: 1 MESSAGE
Content-Type: text/xml
Content-Length: 215
<questionnaire>
    <question answer_type='text' question_desc=<'City'>
        <question_text>
            What city are you calling from?
        </question_text>
        <answer>
            Austin
        </answer>
    </question>
</questionnaire>
```

Another embodiment of the present invention allows a user of a smart device to contact a provider of self-installing content, such as a software program. The provider may send a SIP message with the interactive script to determine the capability of the user's smart device. For example, the script may verify that sufficient memory exists at the smart device to download a requested program. Additionally, the script may verify that the program is supported by the smart device, as in the case of a user with a conventional computer terminal requesting a large program that provides audio when the conventional computer terminal is not equipped with speakers or an audio output capability. Accordingly, use of the interactive script may help a user of a smart device avoid ordering an item that is not supported by the user's device. The invention may further enable a user to automatically provide information from peripheral devices, or even household devices, if the user's smart device is networked to other smart appliances, such as a refrigerator or heating/air-conditioning system via home networking equipment. Accordingly, accurate technical and diagnostic information may be provided using the SIP messages to collect information in order to efficiently and remotely provide information to a service provider and to enable collection of technical and diagnostic information.

Another embodiment of the present invention involving a call from one private citizen to another private citizen could use a similar structure to that shown in FIG. 1. For example, a caller may use an IP-enabled mobile device to call a second party equipped with at least a server and another IP-enabled communications device. For example, a user/caller using a PDA 102 could be a child or teenager instructed to call home. The PDA 102 may be equipped with a global positioning system (GPS) receiver. In an embodiment, the second party's IP-enabled device may be equipped with conventionally available mapping software that provides U.S. street maps corresponding to GPS data. Accordingly, a teenager (first party) calling home using the PDA may automatically receive an inquiry from their home system (second party) to verify their location. The inquiry may be in the form of a complete applet with a questionnaire, or merely a questionnaire to be processed by an embedded applet. As in the first embodiment, the questionnaire with appropriate instructions is transmitted in a SIP MESSAGE. The return SIP MESSAGE with the answers to the queries, including GPS data in any character format recognized by the mapping software, may be received at the second party's IP-enabled device and automatically translated for use of the mapping software. Accordingly, in an embodiment using SIP messaging to inquire of a calling party's device, a parent may verify a child's location, almost in real time, and display the location on a map.

In another embodiment, a security service may call a smart device to request information regarding a home security system. The user of the smart device may be prompted to input information in response to a message containing an interactive script from the security service. For example, a party may be prompted to input authorization information before being connected to an agent wishing to personally verify that an alarm has been improperly activated at the called party's residence. A security system or other service may additionally request a caller to remotely program a security system, such as system activation and de-activation times using the script.

As is illustrated, the present invention can be used to obtain almost any manner of caller data that can be provided at a next generation communications device and translated into a format for communication over a network. Working with translation software, the present invention can enable a called party to automatically query a caller's device or a caller in a manner and order programmed by the script manager.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission public telephone networks represent examples of the state of the art. Such standards are periodically superseded by faster or more efficient equivalents having essentially the same functions. Accordingly, replacement standards and protocols having the same functions are considered equivalents.

What is claimed is:

1. A method of collecting information from a communications device of a user for use by a recipient device, the method comprising:

establishing a communications connection between the communications device and the recipient device;

sending an interactive text markup programming language script to the communications device using a session initiation protocol (SIP) message, the script comprising at least one query; and receiving an answer from the communications device in response to the at least one query, the answer being automatically generated by the communications device.

2. The method of collecting information of claim 1, further comprising:

sending a message to one of a proxy server and a redirect server to establish the communications connection between the communications device and the recipient.

3. The method of collecting information of claim 1, wherein the received answer comprises information of at least one of a location of the communications device, a type of the communications device, a communications format used by the communications device, a communications mode desired by the user of the communications device, a personal identification of a user of the communications device, an account number of a user of the communications device, a password of a user of the communications device, billing information of a user of the communications device, the intent of the user of the communications device, a preferred language of a user of the communications device, and a question from the user of the communications device.

4. The method of collecting information of claim 1, wherein the received answer is a textual representation of one of a DTMF tone, VoiceXML and HTML speech tags.

5. The method of collecting information of claim 1, further comprising providing the answer to a user of the recipient device.

6. The method of collecting information of claim 1, the at least one query of the interactive script comprising a first query and a second query that depends on the answer to the first query.

7. The method of collecting information of claim 1, further comprising translating the answer to the interactive script into text.

8. A method of determining a final call destination for a caller using a communications device, the method comprising:
   sending an interactive text markup programming language script, including at least one query, from a call queue to the communications device using a session initiation protocol (SIP) message;
   attempting to receive an answer to each query from the communications device without requiring an action by the user of the communications device;
   for each query that is not answered by the communications device, presenting the query to the caller via a user interface associated with the communications device;
   when an answer to the at least one query has been received from one of the communications device and the caller, returning the script and the answers to the call queue; and
   determining the call destination based on the answers to the at least one query.

9. The method of determining the final call destination of claim 8, further comprising sending a message to one of a proxy server and a redirect server.

10. The method of determining the final call destination of claim 8, wherein the received answer comprises information of at least one of a location of the communications device, a type of the communications device, a communications format used by the communications device, a communications mode desired by the user of the communications device, a personal identification of a user of the communications device, an account number of a user of the communications device, a password of a user of the communications device, billing information of a user of the communications device, the intent of the user of the communications device, a preferred language of a user of the communications device, and a question from the user of the communications device.

11. The method of determining the final call destination of claim 8, wherein the received answer is a textual representation of one of a DTMF tone, VoiceXML and HTML speech tags.

12. The method of determining the final call destination of claim 8, further comprising providing the answers to an agent at the final call destination.

13. The method of determining the final call destination of claim 8, the at least one query of the interactive script comprising a first query and a second query that depends on the answer to the first query.

14. The method of determining the final call destination of claim 8, further comprising translating the answers to the interactive script into text.

15. A method of interactively pre-screening caller information of a caller using a communications device, the method comprising:
   establishing a communications connection between an information service and the communications device;
   sending an interactive text markup programming language script, including at least one query, from the information service to the communications device used by the caller, using a session initiation protocol (SIP) message;
   integrating into the interactive script at least one answer to the query, the answer being automatically generated by the communications device;
   receiving the script, including the at least one answer, at the information service.

16. The method of interactively pre-screening caller information of claim 15, further comprising establishing a second connection between the communications device and one of a plurality of agent devices using SIP, the one of the plurality of agent devices being determined based on the at least one answer.

17. The method of interactively pre-screening caller information of claim 15, wherein the establishing a communications connection further comprises sending a message to one of a proxy server and a redirect server.

18. The method of interactively pre-screening caller information of claim 15, wherein the received answer comprises information of at least one of a location of the communications device, a type of the communications device, a communications format used by the communications device, a communications mode desired by the user of the communications device, a personal identification of a user of the communications device, an account number of a user of the communications device, a password of a user of the communications device, billing information of a user of the communications device, the intent of the user of the communications device, a preferred language of a user of the communications device, and a question from the user of the communications device.

19. The method of interactively pre-screening caller information of claim 15, wherein the received answer is a textual representation of one of a DTMF tone, VoiceXML and HTML speech tags.

20. The method of interactively pre-screening caller information of claim 15, further comprising providing the answer to an agent of the information service at an agent terminal.

21. The method of interactively pre-screening caller information of claim 15, the at least one query of the interactive script comprising a first query and a second query that is based upon a first answer to the first query.

22. The method of interactively pre-screening caller information of claim 15, further comprising translating the answers to the interactive script into text.

23. A computer readable medium for storing a computer program that controls collection of information from a communications device of a user for receipt at a recipient device, the computer readable medium comprising:
   a session initiation protocol (SIP) segment that creates a session initiation protocol message that is sent to the communications device, the SIP message comprising an interactive text markup programming language script that comprises at least one query;
   a data processing segment that receives and analyzes an answer from the communications device in response to the at least one query, the answer being automatically generated by the communications device.

24. An data reception system that receives collected data from a communications device of a caller, comprising:
   an automated call distributor that receives a call from a user device over an IP network;
   a call queue that receives the call from the automated call distributor and sends an interactive text markup programming language script, including at least one query, to the communications device of the caller using a session initiation protocol (SIP) message;
   a media gateway that translates the script into a format compatible with the communications device of the caller when the communications device of the caller does not support the modality of the script as sent by the call queue;
   wherein when an answer to the at least one query, automatically generated by the communications device, has been received from the communications device, the answers are processed at the call queue.

* * * * *